April 23, 1963 D. B. JAMES 3,087,150

ANALOG-TO-DIGITAL ENCODER

Filed Sept. 14, 1960 3 Sheets-Sheet 1

INVENTOR
D. B. JAMES
BY Lucian C. Canepa
ATTORNEY

April 23, 1963 D. B. JAMES 3,087,150

ANALOG-TO-DIGITAL ENCODER

Filed Sept. 14, 1960 3 Sheets-Sheet 2

INVENTOR
D. B. JAMES
BY Lucian C. Canepa
ATTORNEY

April 23, 1963 D. B. JAMES 3,087,150
ANALOG-TO-DIGITAL ENCODER
Filed Sept. 14, 1960 3 Sheets-Sheet 3

INVENTOR
D. B. JAMES
BY Lucian C. Canepa
ATTORNEY

United States Patent Office 3,087,150

Patented Apr. 23, 1963

3,087,150

ANALOG-TO-DIGITAL ENCODER

Dennis B. James, Bernardsville, N.J., assignor to Bell Telephone Laboratories, Incorporated, New York, N.Y., a corporation of New York Filed Sept. 14, 1960, Ser. No. 55,898
8 Claims. (Cl. 340—347)

This invention relates to the high speed conversion of information, and more particularly to analog-to-digital encoders employing negative resistance diodes.

In one well-known type of analog-to-digital encoder, the process of encoding or converting an analog sample into an $n$-digit binary code group is carried out sequentially in a digit-by-digit manner, most significant digit first, and requires $n$ digit decisions to completely encode a single analog sample. This type of conversion can be viewed as a geometric progression in which it is first determined in which half of the entire group of possible codes the analog signal sample should be placed; then it is determined in which quarter of the selected half the signal sample should be placed; next, it is determined in which eighth of the selected quarter the signal sample should be placed, and so forth. The process is carried on until the amplitude of the analog signal is specified to the desired degree of fineness. In order to determine the amplitude to one part in 127, in a coder of the type in which the coding steps are linearly related to the amplitude of the analog signal, seven separate digit decisions have to be made. One additional digit decision would, of course, permit determination to one part in 255.

Typically, an $n$-digit analog-to-digital encoder of the digit-by-digit decision type operates in a synchronous manner under the control of an external clock or timing source that respectively provides $n$ sequential clock pulses to $n$ different circuit points of the encoder. In response to these pulses such an encoder sequentially performs and stores the results of $n$ amplitude comparison or digit decision operations.

An object of the present invention is the improvement of information encoders, particularly analog-to-digital encoders.

More specifically, an object of this invention is the provision of digit-by-digit decision type analog-to-digital encoders which are characterized by extreme simplicity of design.

Another object of the present invention is the provision of analog-to-digital encoders which are characterized by high speed, low power dissipation, and high reliability.

These and other objects of the present invention are realized in a specific illustrative analog-to-digital encoder embodiment thereof that includes $n$ stages each of which comprises a single voltage-controlled negative resistance diode that is normally biased for bistable operation by a multiphase clock signal source that also supplies timing or switching signals in sequence to the encoder diodes.

Connected to each of the $n$ diodes is the output or feedback path of a circuit that includes a single voltage-controlled negative resistance diode that is biased for monostable operation, which circuit functions both as a summing amplifier and as a regenerative monostable multivibrator. The input path of the amplifier-multivibrator circuit is coupled to a source of analog signals to be encoded. Additionally, binary-weighted resistances are connected between the input path of the amplifier-multivibrator circuit and respective ones of the $n$ diodes.

The application to the $n$ diodes of a reset signal from the multiphase clock signal source of the illustrative encoder insures that the diodes are initially set in their relatively low voltage stable operating conditions, which relatively low voltage may, for example, be representative of a "0" signal. Then, an analog signal to be encoded is applied to the input path of the amplifier-multivibrator circuit, causing current flow through the monostable-biased diode of the amplifier-multivibrator circuit in a direction which does not tend to initiate therein a regenerative switching cycle, and the multiphase source then supplies a first timing signal to the first or most significant digit stage to cause its diode to switch to the relatively high voltage positive resistance region of the characteristic curve thereof. This switching action causes a binary-weighted current to be applied to the input path of the amplifier-multivibrator circuit. Assuming that this binary-weighted current from the most significant digit stage is less than the current derived from the input analog signal, the direction of current flow through the diode of the amplifier-multivibrator circuit continues in the direction which does not tend to initiate in the circuit a regenerative switching cycle. As a result, when the multiphase source supplies a second timing signal to the first encoder stage, the diode of the first stage is not switched back to its relatively low voltage stable condition, for the coincident application of the second timing signal from the multiphase source and of a regenerated feedback signal from the amplifier-multivibrator circuit is necessary to reset the first diode. In turn, the absence of a regenerated signal output from the amplifier-multivibrator circuit, which absence or relatively low voltage level is representative of a "0" signal, is coupled to an inverter circuit which provides at its output a relatively high voltage level or "1" signal, thereby to indicate that the digital code representation of the analog signal should include a "1" signal in the most significant digit place thereof.

Thus, for the assumed case in which the binary-weighted current from the first or most significant digit stage is less than the current derived from the input analog signal, the diode of the first stage is caused to switch to and remain in its relatively high voltage stable condition representative of a "1" signal, which condition causes the continued application of the binary-weighted output current to the input path of the amplifier-multivibrator circuit.

If, on the other hand, the switching of the diode of the first stage to the relatively high voltage positive resistance region of its characteristic curve causes a binary-weighted current of a magnitude greater than the current derived from the input analog signal to be applied to the input path of the amplifier-multivibrator circuit, the diode of the circuit is triggered to cause the circuit to undergo a regenerative switching cycle, which causes a regenerated signal to be fed back to the first stage and a relatively high voltage level or "1" signal to be coupled to the input of the inverter circuit. The feedback signal combines with the second timing signal output of the multiphase source to switch the first diode back to its relatively low voltage stable condition, and the inverter circuit responds to the application thereto of the "1" signal by providing a relatively low voltage level or "0" output signal, thereby to indicate that the digital code representation of the analog signal should include a "0" signal in the most significant digit place thereof.

Thus, for the assumed case in which the binary-weighted current from the first or most significant digit stage is greater than the current derived from the input analog signal, the diode of the first stage is caused to switch to its relatively high voltage stable condition and then, due to the coincident application thereto of the second timing signal and the feedback signal, to switch back to its relatively low voltage stable condition representative of a "0" signal, which condition causes the discontinuance of the flow of the binary-weighted current representative of the first stage to the input path of the amplifier-multivibrator circuit.

In a similar manner each stage of the specific illustrative analog-to-digital encoder described herein responds to an applied switching signal by performing an amplitude comparison operation and by then storing the result of that operation.

It is a feature of the present invention that an analog-to-digital encoder include $n$ stages each of which comprises only a single negative resistance diode of the voltage-controlled type, the diode being capable both of performing an amplitude comparison operation and of storing the result thereof.

It is another feature of the present invention that an analog-to-digital encoder include $n$ stages each of which comprises only a single voltage-controlled negative resistance diode, and that a circuit which also includes only a single voltage-controlled negative resistance diode and that is capable of functioning both as a summing amplifier and as a monostable regenerative multivibrator be connected to each of the $n$ diodes for selectively controlling the amplitude comparison operations thereof.

A complete understanding of the present invention and of the above and other features and advantages thereof may be gained from a consideration of the following detailed description of an illustrative embodiment thereof presented hereinbelow in connection with the accompanying drawing, in which.

Figure 1:
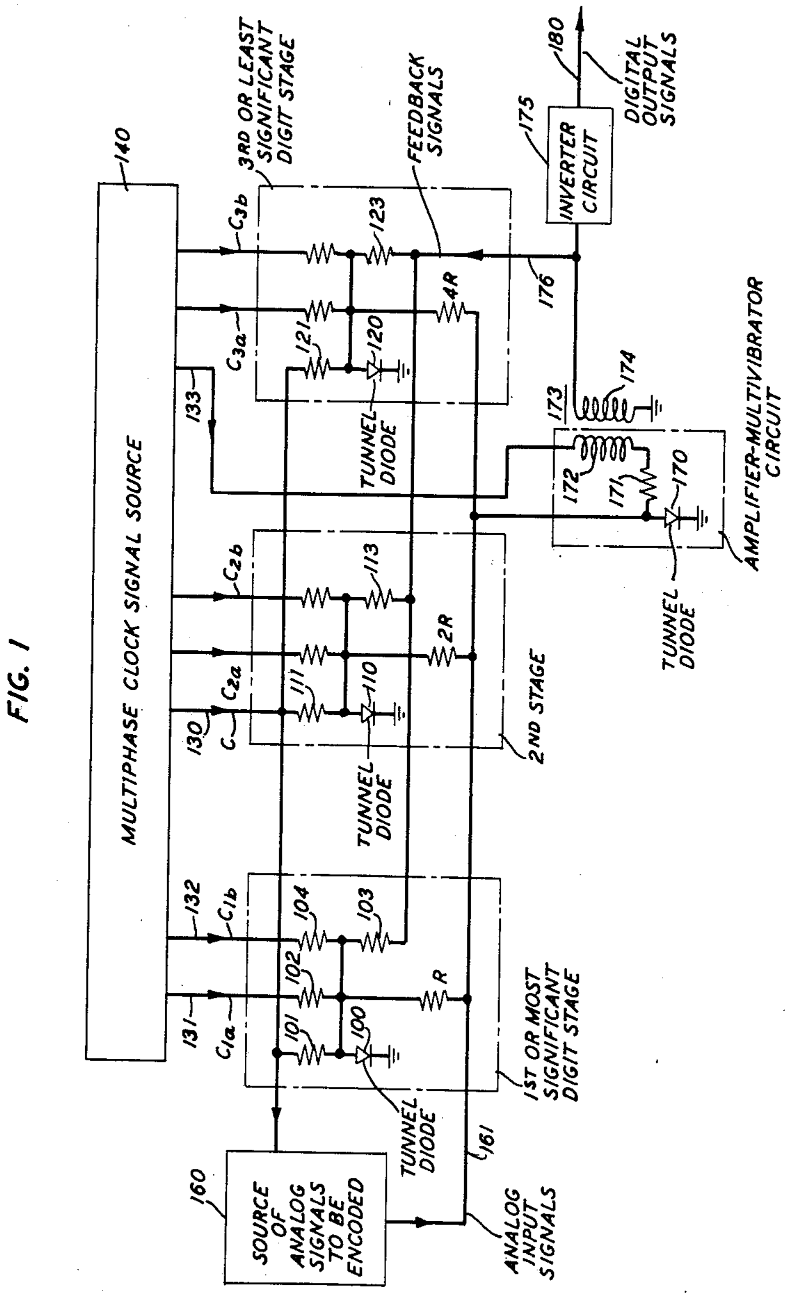
FIG. 1 depicts a three-stage analog-to-digital encoder which illustratively embodies the principles of the present invention.
Figure 3A:
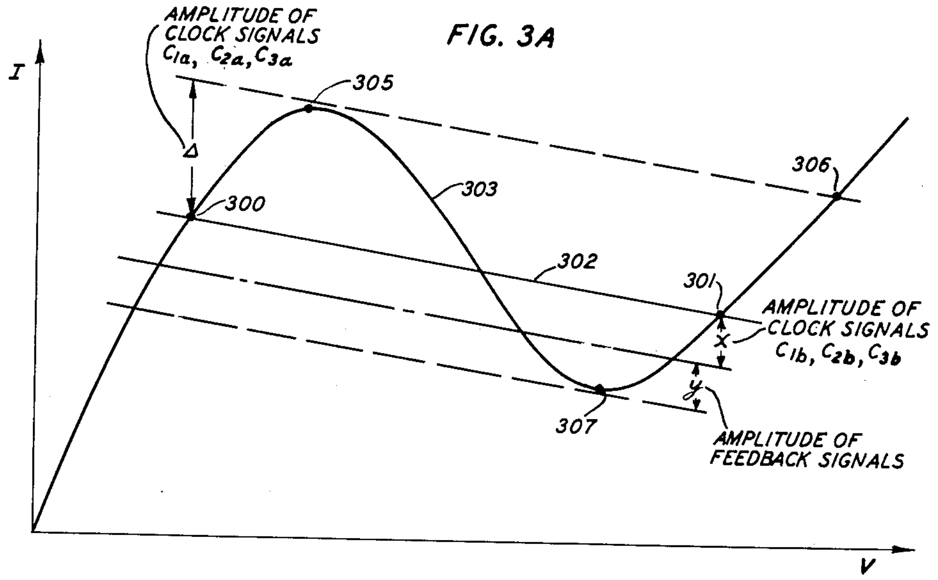
Figure 3B:
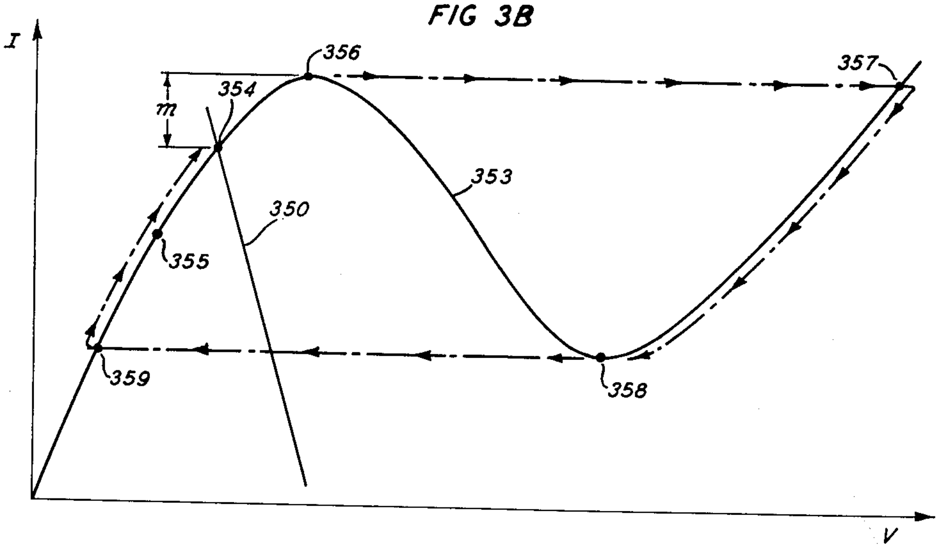

FIG. 3A illustrates the voltage-current characteristic curve of each of the voltage-controlled negative resistance diodes of the three stages shown in FIG. 1 and, further, indicates the type of switching action that takes place in each of the stages in response to applied timing and feedback signals; and FIG. 3B illustrates the voltage-current characteristic curve of the voltage-controlled negative resistance diode of the amplifier-multivibrator circuit shown in FIG. 1 and, further, indicates the type of switching action that takes place in the circuit in response to the application thereto of analog and binary-weighted current signals.

A great variety of electronic devices and circuits exhibit negative resistance characteristics and it has long been known that such negative resistance characteristics may have one of two forms. The N-type negative resistance, which is referred to as open-circuit stable (or short-circuit unstable, or current-controlled) is characterized by zero-resistance turning points. The S-type negative resistance, which is referred to as short-circuit stable (or open-circuit unstable, or voltage-controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January-March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction: that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Referring now to FIG. 1, there is shown a specific illustrative three-stage analog-to-digital encoder made in accordance with the principles of the present invention. Although only three stages are depicted in FIG. 1, it is to be clearly understood that in accordance with the principles set forth herein an $n$ stage analog-to-digital encoder may be constructed.

Each of the three stages of the encoder of FIG. 1 includes therein a voltage-controlled negative resistance diode. Specifically, the first or most significant digit stage includes a diode 100, the second stage includes a diode 110, and the third or least significant digit stage includes a diode 120. The diodes 100, 110, and 120 are connected through associated bias resistors 101, 111, and 121, respectively, and a lead 130 to a multiphase clock signal source 140. The waveform C which appears on the lead 130 is depicted in FIG. 2 and indicates that the voltage there present is either a ground potential reset signal or a positive potential with respect to ground of a value which is preselected to bias each of the diodes 100, 110, and 120 for bistable operation, as depicted in FIG. 3A wherein the intersections 300 and 301 of the load line 302 with the voltage-current characteristic curve 303 represent the relatively low and relatively high voltage stable operating points, respectively, of each of the diodes 100, 110, and 120 of the encoder shown in FIG. 1.

Figure 2:
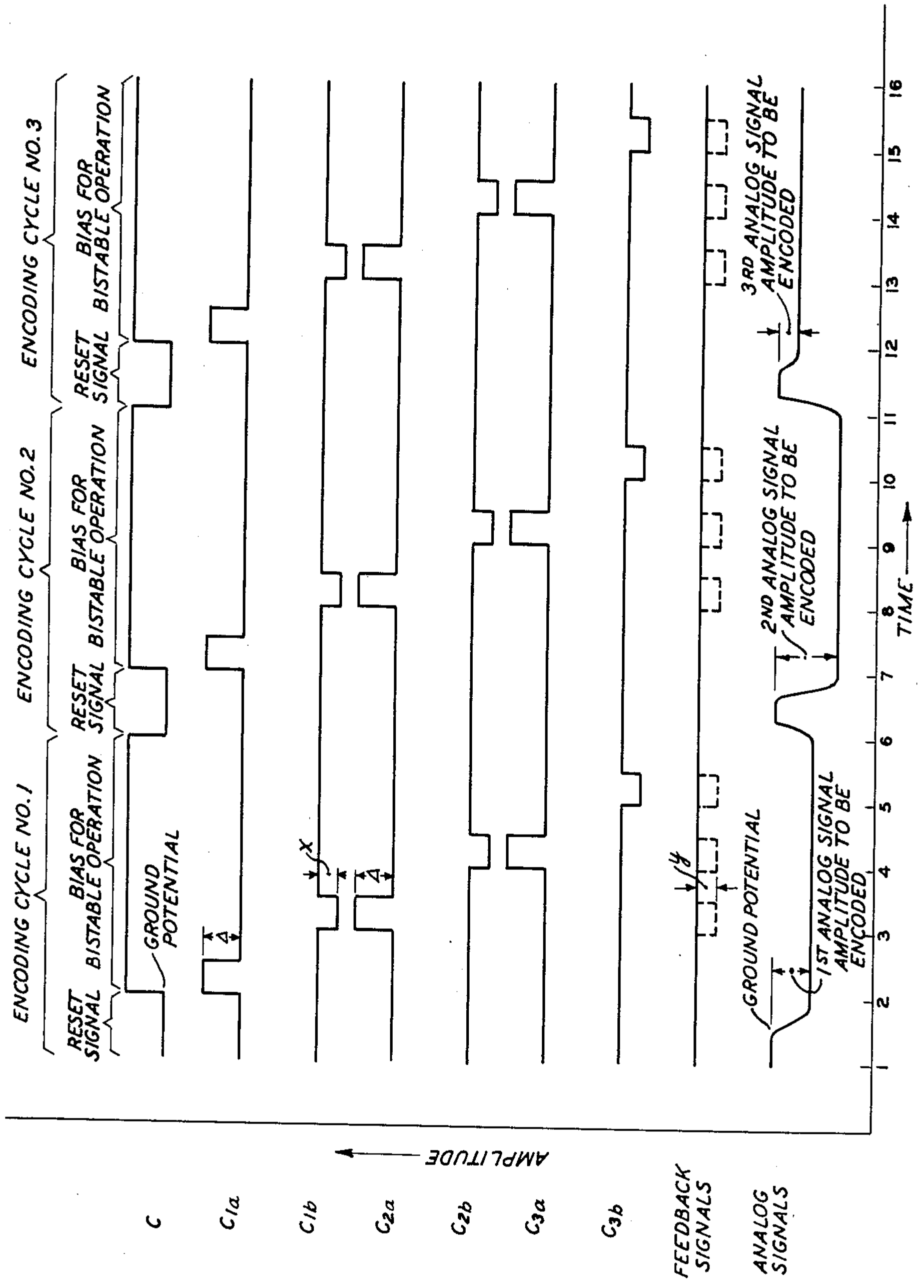
FIG. 2 depicts various waveforms characteristic of the encoder shown in FIG. 1.

Initially, i.e., during the time interval marked 1 through 2 on the time axis of FIG. 2, each of the diodes 100, 110, and 120 of FIG. 1 is set to its relatively low voltage stable operating point 300 (FIG. 3A) by applying to the diodes via the lead 130 a ground potential reset signal which, at time 2, increases to a positive value that biases the diodes for bistable operation. Also, at time 2, the multiphase clock signal source 140 supplies to the diode 100 of the first stage via a lead 131 and a resistor 102 a signal $C_{1a}$, whose amplitude $\Delta$ is sufficient to switch the diode 100 from the relatively low voltage stable operating point 300 over the peak point 305 to a point 306. Then, as the signal $C_{1a}$ returns to its relatively low voltage level, the operating point of the diode 100 shifts from the point 306 to the relatively high voltage stable operating point 301.

Between times 1 and 2, a source 160 of analog signals to be encoded is triggered by the signal C appearing on the lead 130 to provide by time 2 on a lead 161 a negative analog signal. This negative signal causes a current to flow upward through a voltage-controlled negative resistance diode 170 which is a component of a circuit that functions both as a summing amplifier and as a monostable regenerative multivibrator. The amplifier-multivibrator circuit also comprises a resistor 171 and an inductor 172 which are connected to a lead 133 that in turn is connected to the clock source 140. The voltage level appearing on the lead 133 remains constant at a relatively high level which is selected to be of a value to bias the diode 170 for monostable operation, as indicated in FIG. 3B wherein the load line 350 intersects the characteristic curve 353 of the diode 170 at only one stable quiescent operating point 354.

As noted above, the application of a negative analog signal to the lead 161 causes a positive current to flow upward through the diode 170 of FIG. 1. The effect of this current is to shift the operating point 354 of the diode 170 downward on the characteristic curve 353 of FIG. 3B to some lower current point, say, 355, which is a function of the amplitude of the analog signal to be encoded.

The switching of the diode 100 of the first stage of the encoder of FIG. 1 causes the voltage across the diode 100, and, therefore, also that across the binary-weighted resistor R connected thereto, to be relatively high, which causes a relatively high positive current to flow downward through the diode 170 of the amplifier-multivibrator circuit. If the value of this positive current is sufficient to raise the operating point of the diode 170 above the peak point 356 (FIG. 3B) of the characteristic curve 353 thereof, a regenerative switching cycle ensues. In such a cycle, the operating point of the diode 170 switches over the peak point 356 to a point 357 on the relatively high voltage positive resistance region of the characteristic curve. Then, as the magnetic field about the inductor 172 collapses, the operating point of the diode 170 charges downward toward the valley point 358 of the characteristic curve 353 and switches to a point 359 on the relatively low voltage positive resistance region of the curve. Then, as the magnetic field about the inductor 172 once again collapses, the operating point of the diode 170 charges back to the initially-assumed operating point 355.

The inductor 172 associated with the diode 170 may, advantageously, be the primary of a transformer 173. Accordingly, whenever the diode 170 undergoes a regenerative switching cycle, a regenerated pulse appears across the secondary winding 174 of the transformer and is coupled to an inverter circuit 175 and to a feedback path 176.

The pulse or "1" signal coupled to the circuit 175 is inverted and appears as a "0" signal on the output path 180 thereof, thereby to indicate that, in view of the fact that the binary-weighted current contributed to the diode 170 by the first digit stage was greater than the current derived from the analog signal, the most significant digit of the binary code representative of the analog signal should be a "0" signal.

It is noted that the bias conditions for the diode 170 may, advantageously, be selected such that the diode does not undergo a regenerative switching cycle until the binary-weighted current contribution thereto from the first stage is greater than the current derived from the analog signal by an amount $m$ (FIG. 3B) which is approximately one-half of the current value that corresponds to the binary-weighted current contribution from the least significant digit stage of the illustrative encoder.

The pulse or "1" signal coupled to the feedback path 176 from the transformer 173 is applied at time 3 (FIG. 2) through resistors 103, 113, and 123 to the diodes 100, 110, and 120, respectively. Accordingly, when, at time 3, the multiphase clock signal source 140 supplies a signal $C_{1b}$ via a lead 132 and a resistor 104 to the diode 100 of the most significant digit stage, the diode 100 responds to the coincident application thereto of the negative signal $C_{1b}$ and the negative feedback signal to switch back to its relatively low voltage stable condition. This action is depicted in FIG. 3A, wherein it is indicated that the clock signal $C_{1b}$ is by itself of an amplitude $x$ which is insufficient to cause the diode 100 to be switched back to the relatively low voltage stable operating point 300. On the other hand, the coincident application of $C_{1b}$ and a feedback signal of amplitude $y$ to the diode 100 causes the operating point thereof to be switched past the valley point 307 to the relatively low voltage positive resistance region of the characteristic curve 303. Note that the positions in which feedback signals may or may not actually appear are outlined in dashed lines in FIG. 2.

If, on the other hand, the switching of the diode 100 by the clock signal $C_{1a}$ causes a flow through the diode 170 of a binary-weighted current whose value relative to the current value derived from the input analog signal is insufficient to initiate a regenerative switching cycle in the amplifier-multivibrator circuit, no pulse (i.e., a "0" signal) appears across the secondary winding 174 of the transformer 173. This "0" signal is inverted by the circuit 175 and appears as a "1" signal on the output lead 180, and since, under such conditions, no feedback signal appears on the path 176, the diode 100 is not switched back to its relatively low voltage condition by the clock signal $C_{1b}$. Accordingly, the first or most significant digit stage continues to supply a binary-weighted current to the amplifier-multivibrator circuit.

To summarize briefly so far: initially the diode 100 of the first stage is set to its relatively low voltage stable condition by the voltage C supplied by the source 140. Then, the diode 100 is switched by the signal $C_{1a}$ to its relatively high voltage stable condition where it remains or is switched back to its relatively low voltage stable condition depending respectively on whether the amplifier-multivibrator circuit is not triggered or triggered to generate a feedback signal to be combined with the negative clock signal $C_{1b}$. In turn, whether the amplifier-multivibrator circuit is triggered or not depends on the relative magnitudes of the current derived from the analog signal to be encoded and the binary-weighted current representative of the first stage.

The operation of the second and third stages of the illustrative encoder shown in FIG. 1 is identical to the operation described hereinabove as being characteristic of the first encoder stage. As indicated in FIGS. 1 and 2, the operation of the second stage is under the control of timing signals $C_{2a}$ and $C_{2b}$, and that of the third stage is controlled by timing signals $C_{3a}$ and $C_{3b}$.

Note that the time interval 1 through 6 is designated in FIG. 2 as the time of a first encoding cycle, in which interval a first analog signal amplitude to be encoded is applied to the illustrative encoder. Similarly, the time intervals 6 through 11 and 11 through 16 are designated as the second and third encoding cycle times, respectively, in which intervals second and third analog signal amplitudes to be encoded are applied to the illustrative encoder.

The configurations of the multiphase clock signal source 140 and the inverter circuit 175 are considered, in view of the end requirements therefor specified herein, to be clearly within the skill of the art and have, accordingly, not been depicted herein in complete detail.

It is emphasized that although particular attention has been directed to the use of tunnel diodes as the voltage-controlled negative resistance devices of the specific illustrative encoder described herein, other two-terminal voltage-controlled negative resistance arrangements having characteristics of the type shown in FIGS. 3A and 3B may also be used therefor.

Furthermore, it is to be understood that the above-described arrangements are only illustrative of the application of the principles of the present invention. Numerous other arrangements may be devised by those skilled in the art without departing from the spirit and scope of the invention. For example, rather than employing the inverter circuit 175 to provide digital output signals from the encoder shown in FIG. 1, output signals may be derived directly from the voltages appearing across binary-weighted resistors R, 2R, and 4R.

What is claimed is:

1. In combination in a system for encoding an analog signal into a digital representation thereof, $n$ stages including just $n$ voltage-controlled negative resistance diodes, means for biasing said diodes in their relatively low voltage states for bistable operation, means for successively switching said diodes from their relatively low to their relatively high voltage states, circuit means responsive to the analog signal to be encoded and to a signal representative of the successive switchings of said diodes for providing a feedback signal only when the total signal current representative of the switching of said $n$ diodes is greater than the current derived from the analog signal, and means responsive to said feedback signals for switching back to their relatively low voltage states the ones of said $n$ diodes whose switching caused the total signal current representative of the switching of said $n$ diodes to be greater than the analog signal current.

2. A combination as in claim 1 wherein said circuit means includes a voltage-controlled negative resistance diode, means for biasing said diode for monostable operation, and inductance means connected in series with said diode.

3. A combination as in claim 2 wherein all of said voltage-controlled negative resistance diodes are tunnel diodes.

4. A combination as in claim 3 further including means coupled to said inductance means for abstracting therefrom a regenerated signal whenever said circuit means is triggered to undergo a switching cycle.

5. A combination as in claim 4 still further including inverter means responsive to signals appearing across said abstracting means.

6. In combination in a system for encoding an analog signal into a digital representation thereof, $n$ stages each including only a single tunnel diode, means for biasing said tunnel diodes in their relatively low voltage conditions for bistable operation, and means for sequentially switching said tunnel diodes from their relatively low to their relatively high voltage states, whereby a stage provides a binary-weighted current when the diodes associated therewith is switched to its relatively high voltage state.

7. A combination as in claim 6 further including monostable regenerative circuit means comprising only a single tunnel diode for comparing the current derived from the analog signal to be encoded with the binary-weighted current representative of the relatively high voltage states of switched tunnel diodes and for supplying a feedback signal to the tunnel diodes of said $n$ stages only if the binary-weighted current exceeds the current derived from the analog signal.

8. In combination in a system for encoding an analog signal into a digital representation thereof, a plurality of stages each including only a single tunnel diode, means for biasing said tunnel diode in its relatively low voltage state for bistable operation, means for switching said tunnel diode from its relatively low to its relatively high voltage state, monostable regenerative circuit means including a tunnel diode connected in series with an inductor for comparing the current derived from the analog signal to be encoded with a current representative of the presence of said tunnel diode in its relatively high voltage state and for undergoing a regenerative switching cycle only if the second-mentioned current is greater than the first-mentioned current, and means responsive to said circuit means undergoing a regenerative switching cycle for switching said tunnel diode back to its relatively low voltage state.

References Cited in the file of this patent

UNITED STATES PATENTS 2,970,309 Towles ---------------- Jan. 31, 1961